United States Patent [19]

Yamada

[11] Patent Number: 5,313,312
[45] Date of Patent: May 17, 1994

[54] COLOR IMAGE PROCESSING APPARATUS CAPABLE OF DISCRIMINATING ATTRIBUTES OF ORIGINALS FED BY A FEEDER

[75] Inventor: Masanori Yamada, Kawasaki, Japan

[73] Assignee: Canon Kabushiki Kaisha, Tokyo, Japan

[21] Appl. No.: 971,259

[22] Filed: Nov. 4, 1992

Related U.S. Application Data

[63] Continuation of Ser. No. 560,768, Jul. 31, 1990, abandoned.

[30] Foreign Application Priority Data

Aug. 2, 1989 [JP] Japan .................................. 1-200487

[51] Int. Cl.$^5$ .............................................. H04N 1/46
[52] U.S. Cl. .................................. 358/505; 358/498; 358/523
[58] Field of Search ............ 358/75, 78, 80, 448, 358/453, 462, 505, 506, 513, 523, 474, 497, 498; 355/311, 308, 309, 316; 395/150, 151; H04N 1/46

[56] References Cited

U.S. PATENT DOCUMENTS

| | | | |
|---|---|---|---|
| 4,633,328 | 12/1986 | Saito et al. | 358/467 |
| 4,718,040 | 1/1988 | Ayata et al. | 358/75 |
| 4,829,371 | 5/1989 | Hiramatsu et al. | 358/75 |
| 4,903,143 | 2/1990 | Sakamoto | 358/462 |
| 4,922,349 | 5/1990 | Abe et al. | 358/75 |
| 4,953,012 | 8/1990 | Abe | 358/75 |
| 4,980,760 | 12/1990 | Hiratsuka et al. | |
| 5,028,663 | 5/1993 | Hiratsuka et al. | 358/75 |
| 5,031,034 | 7/1991 | Shimizu et al. | 358/80 |
| 5,220,417 | 6/1993 | Sugiura | 358/468 |
| 5,249,061 | 9/1993 | Nagashima et al. | 358/500 |

*Primary Examiner*—Edward L. Coles, Sr.
*Assistant Examiner*—Kim Yen Vu
*Attorney, Agent, or Firm*—Fitzpatrick, Cella, Harper & Scinto

[57] ABSTRACT

There is provided a color image processing apparatus such as a color copier having the function to automatically discriminate whether each original is a black and white original or a color original. Such an apparatus has a discriminating circuit to discriminate the attribute of each original image, a memory to store the discrimination results by the discriminating circuit every original image in correspondence thereto, and a processor to process the relative original images in accordance with the discrimination results stored in the memory. The discrimination result is read out of the memory a plurality of times for the same original and the same original is processed a plurality of times by the processor on the basis of the discrimination result. The apparatus may also has an RDF to sequentially feed originals one by one to the image processing position by the processor. By executing the copying operation on the basis of the discrimination results stored in the memory, the copying time for the page collating copies in the multi-page copying mode in the case of using the RDF can be fairly reduced.

21 Claims, 15 Drawing Sheets

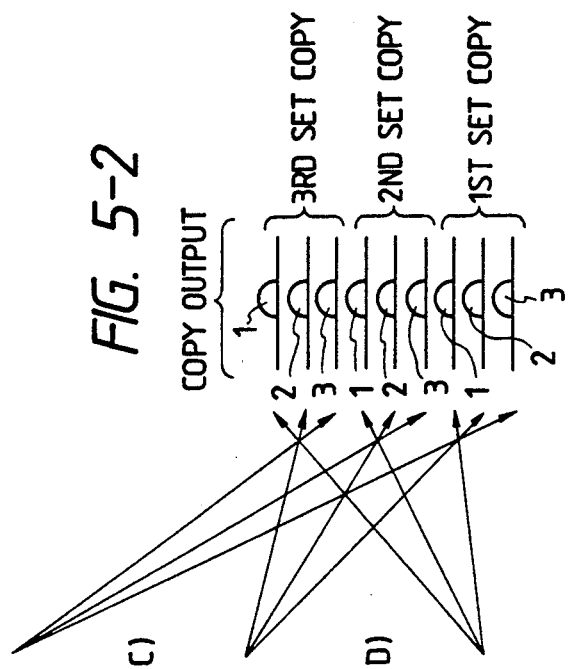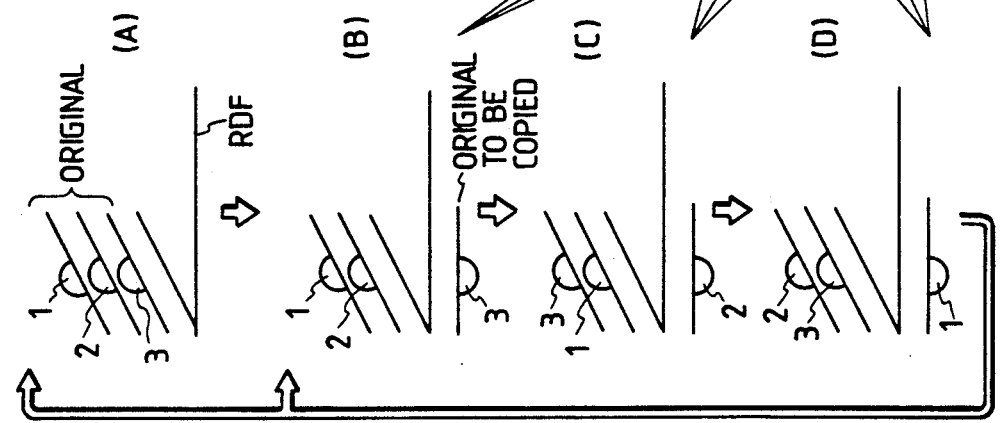

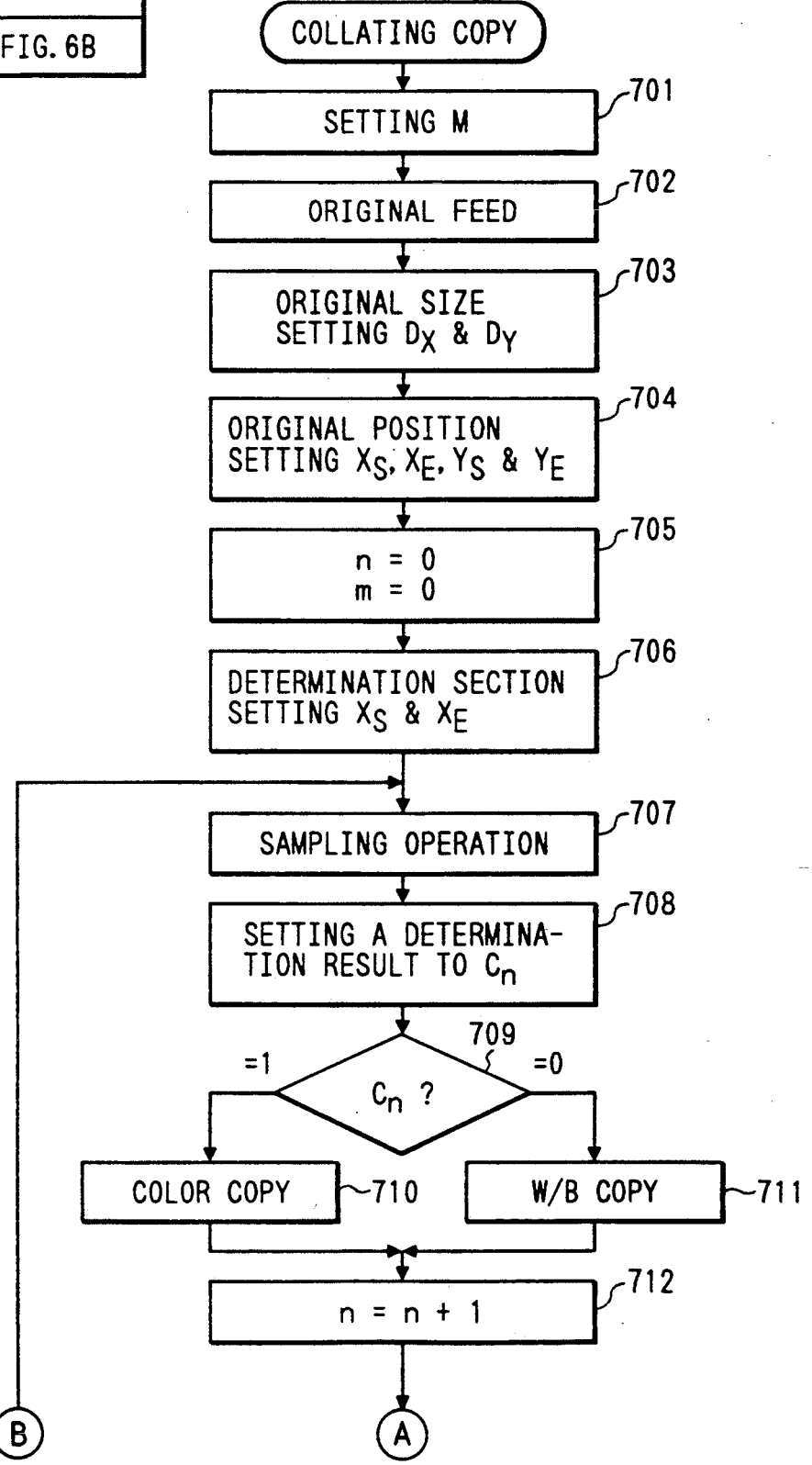

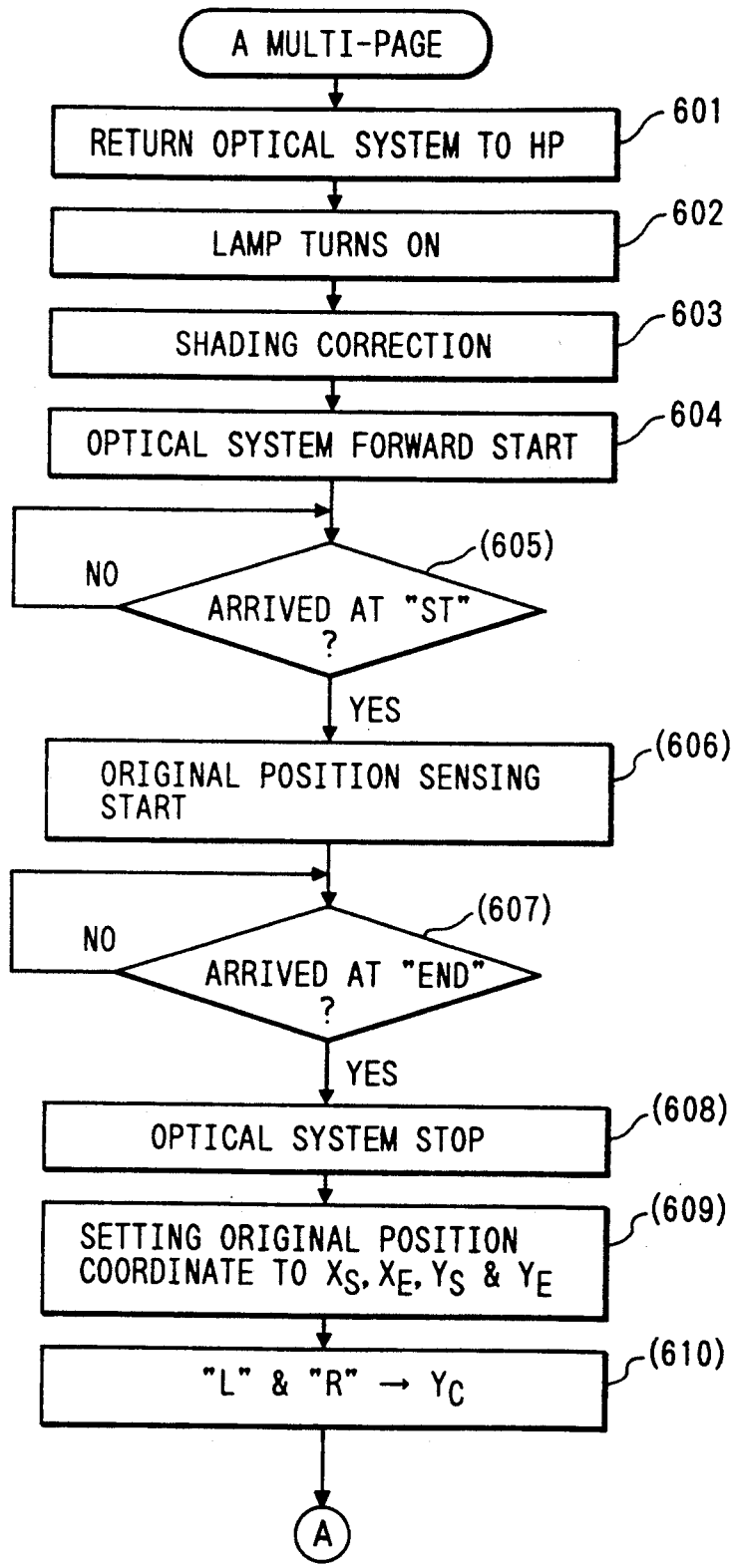

| FIG. 9A |
| FIG. 9B |

COLOR IMAGE PROCESSING APPARATUS CAPABLE OF DISCRIMINATING ATTRIBUTES OF ORIGINALS FED BY A FEEDER

This application is a continuation of application Ser. No. 07/560,768 filed Jul. 31, 1990, now abandoned.

BACKGROUND OF THE INVENTION

1. Field of the Invention

The present invention relates to a color image processing apparatus and, more particularly, to a color image processing apparatus having a function to automatically determine whether an original is a black and white original or a color original.

2. Related Background Art

In U.S. Pat. No. 4,953,012 and U.S. application Ser. No. 416,587 (Oct. 3, 1989) abandoned, the applicant of the present invention has proposed a technique in a color copying apparatus in which whether an original to be read is a black and white (B/W) original or a color original is automatically discriminated a black single color copy is executed in the case of the B/W original, and a copy using four colors of yellow, magenta, cyan, and black is performed in the case of a color original. With the above technique, the copying time and costs can be reduced.

However, according to the above proposed constructions, prior to copying e original image, the original image is pre-scanned and on the basis of the result of the discrimination obtained by the prescan, the original image is copied in either the black and white mode or in the color mode. Therefore, each time the original image is exchanged, the prescan for such a discrimination is performed.

Therefore, in the case where a plurality of originals are repetitively copied by using a recyclable automatic document feeder or where a plurality of areas in the same original are divisionally repetitively copied, the prescan for discrimination is executed many times for the same original or the same area, so that an efficiency is low.

SUMMARY OF THE INVENTION

The present invention is made in consideration of the above problems and it is an object of the invention to discriminate an attribute of an original image and to efficiently execute a process suitable for the original image in accordance with the attribute.

Another object of the invention is to preferably process a plurality of original images in accordance with the attributes of the images.

Still another object of the invention is to repetitively, preferably, and promptly process a plurality of original images.

A further object of the invention is to execute a process suitable for the attribute of each image to the images of a plurality of areas of an original.

Further another object of the invention is to efficiently execute processes in accordance with the result of the discrimination regarding whether an original is a color image or a black and white image.

The above and other objects and features of the present invention will become apparent from the following detailed description and the appended claims with reference to the accompanying drawings.

BRIEF DESCRIPTION OF THE DRAWINGS

FIGS. 5-1 and 5-2 are explanatory diagrams of the first embodiment;

FIGS. 6A and 6B are control flowcharts of the first embodiment;

FIGS. 7-1 and 7-2 are explanatory diagrams of the second embodiment;

FIGS. 8A-8C are control flowcharts of the second embodiment;

DETAILED DESCRIPTION OF THE PREFERRED EMBODIMENTS

The present invention will be described hereinbelow by using preferred embodiments.

Figure 2A:
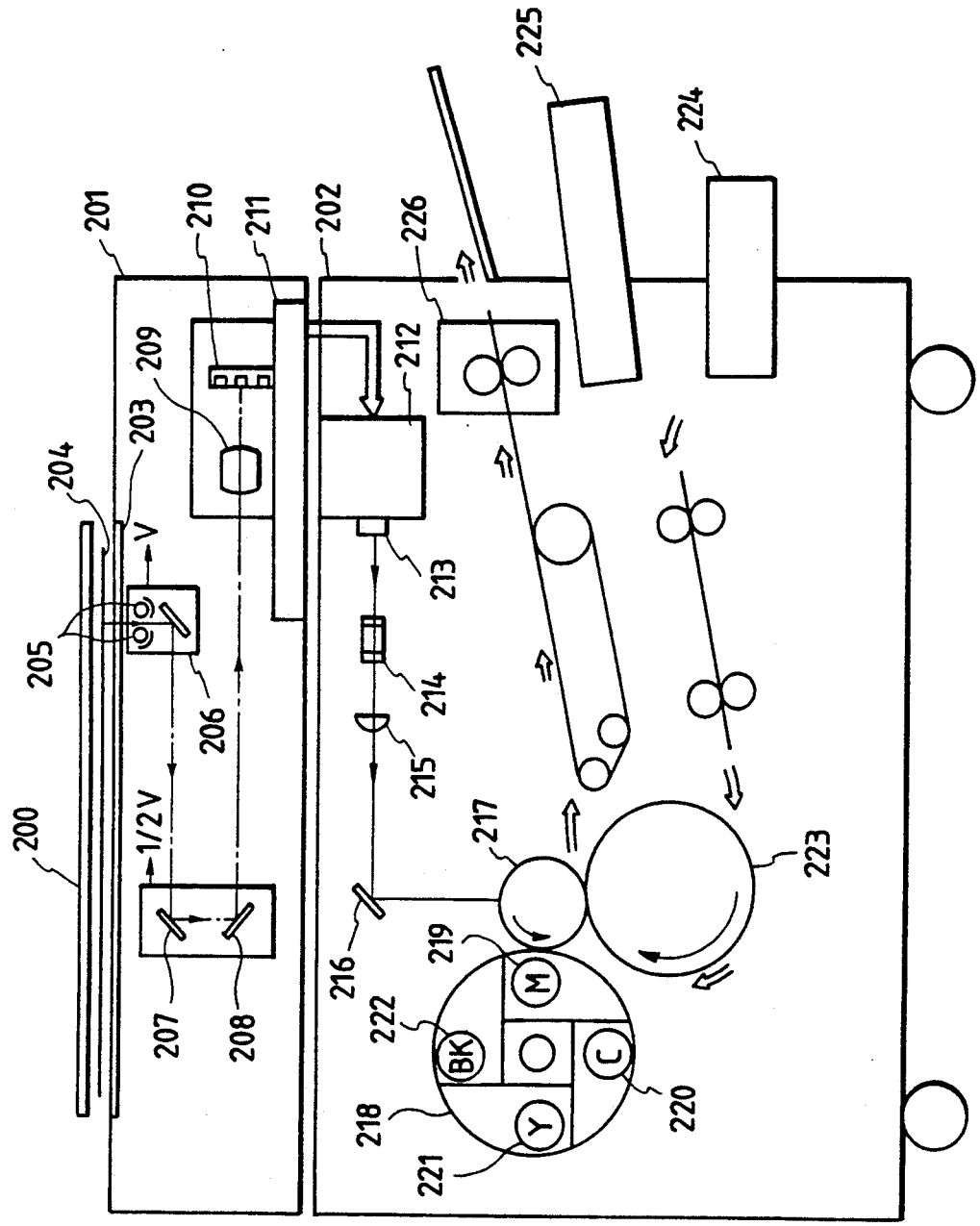
FIGS. 2A and 2B are cross-sectional views of color copying apparatuses.
Figure 2B:
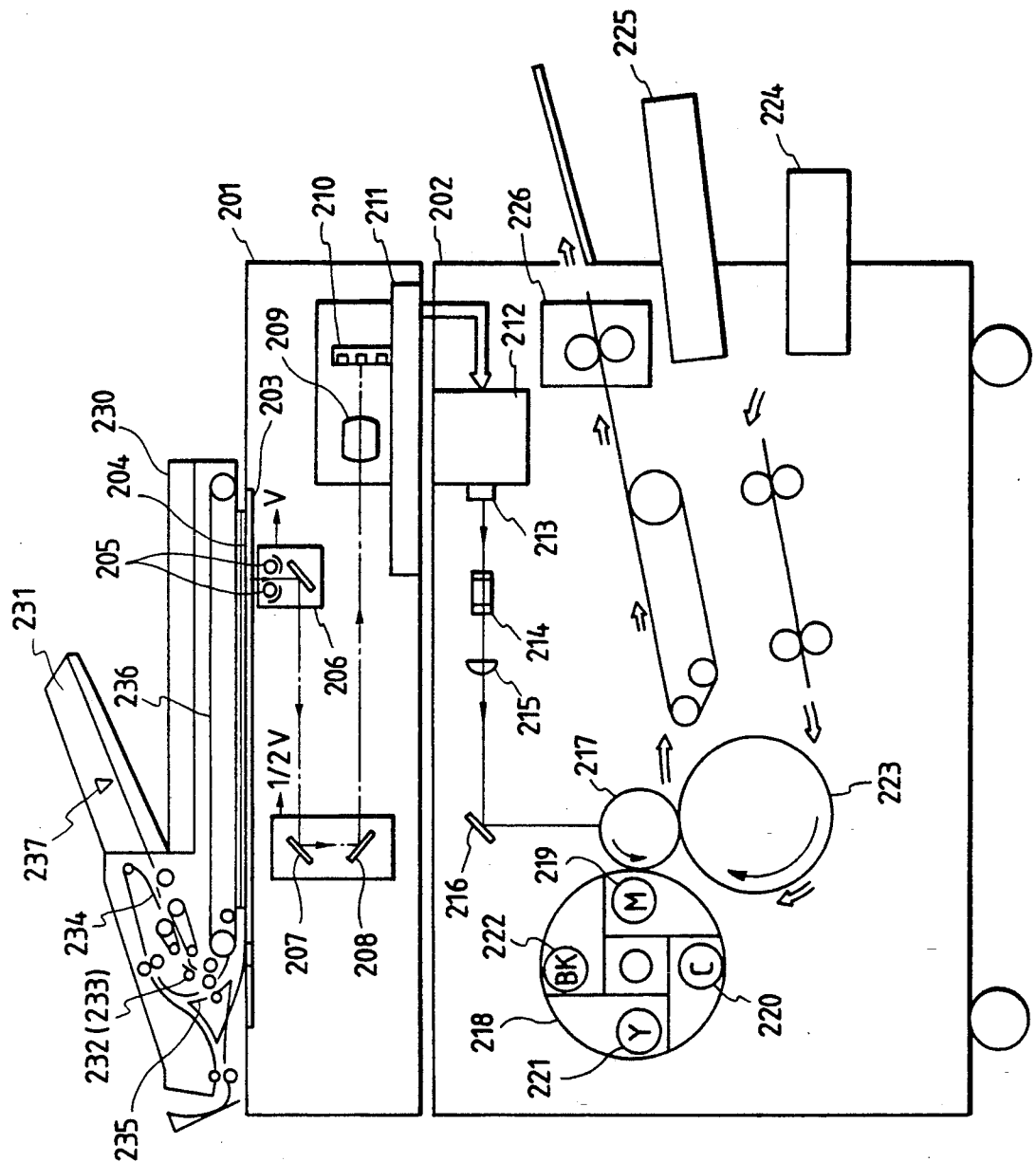

FIGS. 2A and 2B show whole construction diagrams of digital color copying apparatuses.

FIG. 2A shows a construction without a RDF (recyclable automatic document feeder), and FIG. 2B shows a construction using the RDF.

Reference numeral 201 denotes an image scanner unit for color separating a color original and reading and executing a digital signal process. Reference numeral 202 indicates a printer unit for printing and outputting the image corresponding to the original image which was read by the image scanner unit 201 onto a paper in a full color mode.

In the image scanner unit 201, reference numeral 200 denotes a mirror surface pressing plate. An original 204, on an original support glass (hereinafter, referred to as a platen) 203, is illuminated by a lamp 205. The reflected light is reflected to mirrors 206, 207, and 208 and an image is formed onto a 3-line sensor (hereinafter, referred to as a CCD) 210 by a lens 209. The output from CCD 210 is sent to a signal processing unit 211 as full color information, that is, component signals of red (R), green (G), and blue (B). The lamp 205 and the mirror 206 are mechanically moved at a velocity of V and the mirrors 207 and 208 are mechanically moved at the velocity of ½ of V in the direction perpendicular to the electrical scan direction of the line sensor 210, thereby scanning the whole surface of the original. In the signal processing unit 211, the read signal is electrically processed and separated into the color component signals of magenta (M), cyan (C), yellow (Y), and black (Bk) and sent to the printer unit 202. On the other hand, one of the color component signals of M, C, Y, and Bk is sent to the printer unit 202 every original scan by the image scanner unit 201. The single print-out of a full color image is completed by total four original scans.

An image signal of M, C, Y, or Bk which is sent from the image scanner unit 201 is transmitted to a laser driver 212. The laser driver 212 modulates and drives a semiconductor laser 213 in accordance with the image signal. A laser beam from the semiconductor laser 213 scans on a photo-sensitive drum 217 through a polygonal mirror 214, an f−θ lens 215, and a mirror 216. Thus, an electrostatic latent image is formed on the photo-sensitive drum 217 every line.

Reference numeral 218 denotes a rotary developing device comprising: a magenta development unit 219; a cyan development unit 220; a yellow development unit 221; and a black development unit 222. Those four developing units alternately come into contact with the photo-sensitive drum 217 and develop the electrostatic latent image formed on the drum 217 by the toner of each color.

Reference numeral 223 denotes a copy transfer drum. A paper which was fed from a paper cassette 224 or 225 is wrapped around the copy transfer drum 223. The development images of the respective colors, which were developed onto the photo-sensitive drum 217, are overlaid and copy transferred onto the same paper.

After the images of four colors of M, C, Y, and Bk were sequentially copy-transferred onto the same paper as mentioned above, the paper passes through a fixing unit 226 and is discharged.

In FIG. 2B, reference numeral 230 denotes an RDF (recyclable automatic document feeder). The RDF is attached in place of the mirror surface pressing plate 200 in FIG. 2A. In the RDF 230, reference numeral 231 denotes a mounting tray onto which an original is set. Reference numeral 236 indicates a belt to set the original to a predetermined position on the platen 203. Reference numerals 232 and 233 indicate original size detecting sensors which are arranged with a predetermined interval in the direction perpendicular to the feeding direction of the original. The size of original in the width direction can be discriminated by checking whether both of the sensors 232 and 233 have detected the original or only one sensor 233 (it is assumed that the sensor 233 is arranged on the rear side of the drawing) has detected the original. A more accurate size can be determined by increasing the number of such a kind of sensors. On the other hand, the size of original in the length direction can be determined by the time when the sensor 233 (or 232) detects the original.

On the other hand, according to the RDF 230, the original which was sent to an exposing surface from the mounting tray 231 through a sheet path 234 by the belt 236 is transferred through a sheet path 235 by reversely rotating the belt 236, thereby enabling the original to be again set onto the tray 231. Reference numeral 237 denotes a sensor to detect that one or all of a plurality of originals on the tray 231 have been circulated.

Figure 1:
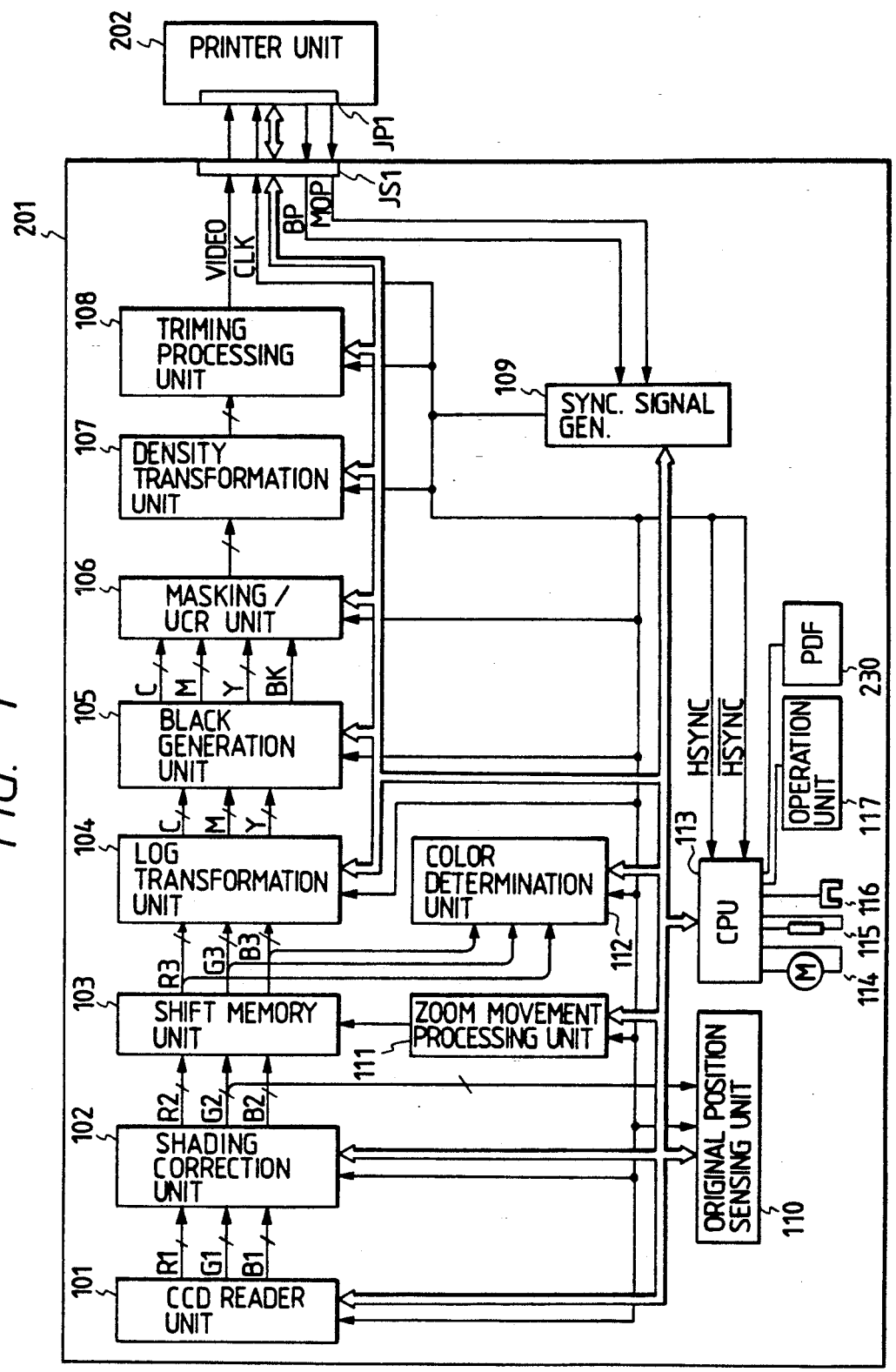
FIG. 1 is a system block diagram of a color copying apparatus to which the present invention was applied.

FIG. 1 shows a block diagram of the color copying apparatus to which the invention was applied and the apparatus will now be described hereinbelow.

A CCD reader unit 101 has: color sensors which can independently obtain analog color signals of R (red), G (green), and B (blue); amplifiers for amplifying the analog color signals every color; and A/D converters for converting the analog color signals into the digital signals of eight bits. The signals, which were shading corrected every color by a shading correction unit 102, are input to a shift memory unit 103, by which deviations among the colors and among the pixels are corrected. The corrected signals are sent to a color determination unit 112, which will be explained hereinlater, and an LOG transformation unit 104 to execute a logarithmic correction for a light/density transformation.

Density signals Y (yellow), M (magenta), and C (cyan) as outputs of the LOG transformation unit 104 are input to a black generation unit 105, by which a black (Bk) signal is produced. The Bk signal is generated by, for instance, Min (Y, M, C). Further, in a masking/UCR unit 106, the filter characteristics and the toner density characteristics of the color sensors are corrected for the output signals of Y, M, C, and Bk from the black generation unit 105 and the under colors are eliminated. After that, the color component signal corresponding to one color to be developed among the four color signals is selected.

The selected color component signal is then density transformed by a density transformation unit 107 in accordance with the developing characteristics of the printer and a favor of the operator. After that, the signal is subjected to an editing process such as extraction, erasure, or the like of a desired section by a trimming processing unit 108. Then, the processed signal is sent to the printer unit 202 and an image is formed.

On the basis of a horizontal sync signal BD (beam detection) signal and a vertical sync signal ITOP (image top) signal which are synchronized with the printing timing of each line which are sent from the printer unit 202, a sync signal generation unit 109 generates a horizontal sync signal HSYNC, a pixel sync signal CLK, and the like which are used in the image scanner unit 201 and transmits to each processing unit and the CPU.

An original position sensing unit 110 detects the position and size of the original on the basis of a binary signal of the green (G) signal which was shading corrected. On the other hand, a zoom movement processing unit 111 controls the writing and reading periods and timings of data into/from a shift memory, thereby realizing the zoom and movement of the image.

A CPU 113 has not only a micro-processor but also well-known I/O circuit, timer circuit, interruption control circuit, serial communication circuit, ROM, RAM, and the like and controls each of the above processing units. Further, the CPU 113 controls a pulse motor 114 to drive the optical system, an original illuminating lamp 115, a sensor 116 to detect the position of the optical system, and an operation unit 117. The CPU 113 executes a serial communication with the RDF 230 and controls the operation of the RDF 230.

The detection of the coordinates of the position of an original in the original position sensing unit 110 will now be described.

Figure 4B:
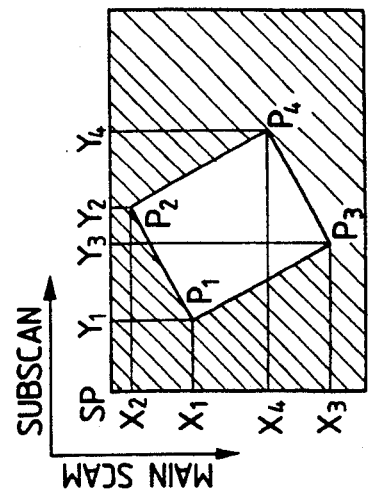
FIG. 4B is a diagram showing a state of an original.

In the case where the RDF 230 is not attached but the pressing plate 200 is attached, since the pressing plate 200 has been processed as a mirror surface as mentioned above and the background of the original is ordinarily white, as shown in FIG. 4B, for instance, the position of the white signal in the black signal is detected by a luminance signal level which was properly binarized and is regarded as original position.

Figure 4A:
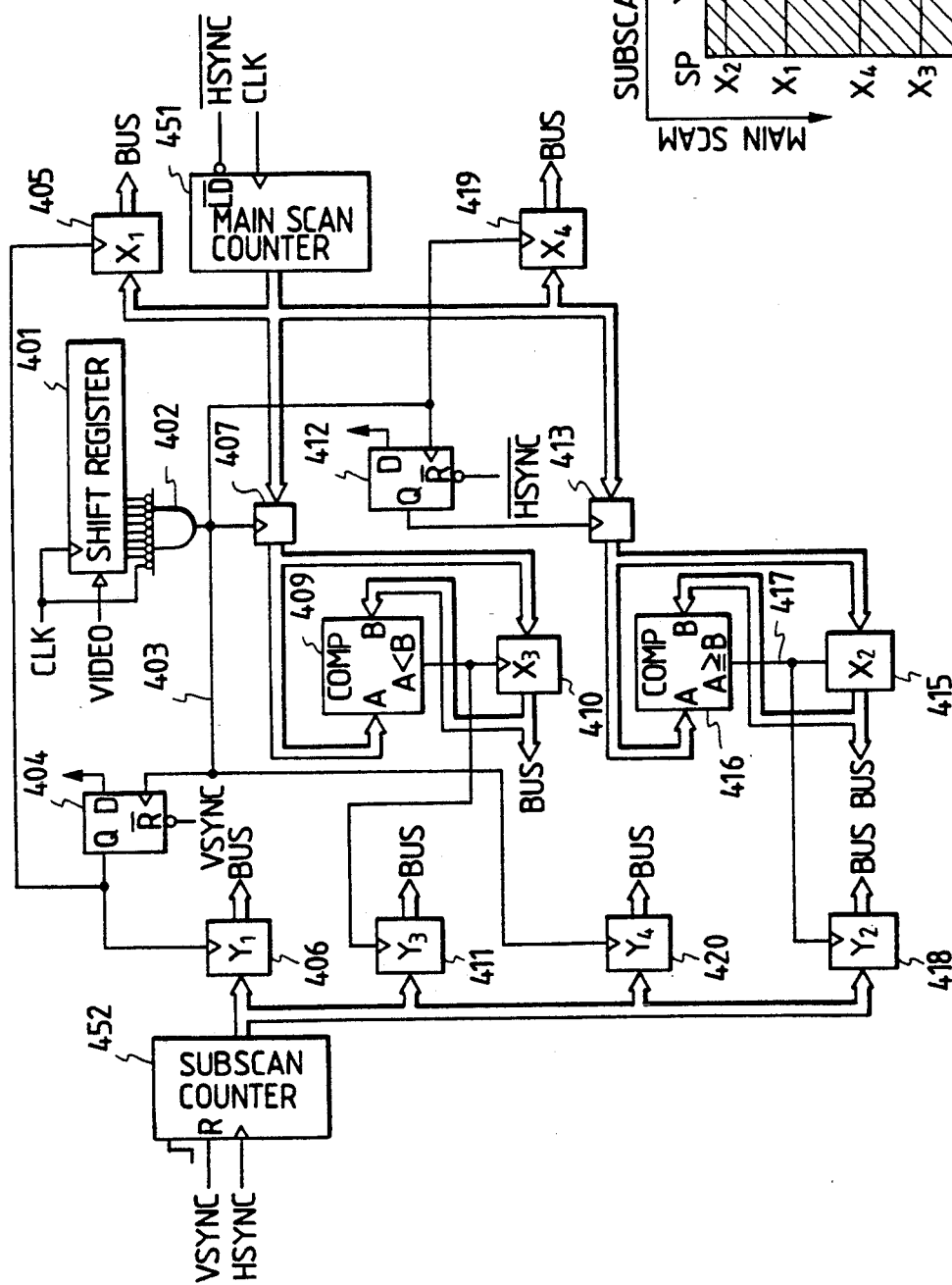
FIG. 4A is a block diagram of an original position sensing unit.

A construction to detect the coordinates is shown in a circuit diagram of FIG. 4A and will be explained hereinbelow.

A main scan counter 451 is a down counter and shows the scan position in one main scan line. The counter 451 is set to the maximum value in the main scan direction (X direction) by the horizontal sync signal HSYNC and counts down each time the image data clock CLK is input. A subscan counter 452 is an up counter and is reset to "0" in response to the leading edge of a VSYNC (image front edge signal). The counter 452 counts up by the HSYNC signal and indicates the scan position in the subscan direction.

Image data VIDEO which was obtained by binarizing G signal is input to a shift register 401 on an 8-bit unit basis. The G signal is obtained by pre-scanning of platen 203 by the CCD. At the time point when the 8-bit input was completed, a gate circuit 402 checks to see if all of the 8-bit data indicate a white image or not. If YES, the gate circuit 402 outputs a "1" signal to a signal line 403. After the prescan was started, when the first 8-bit white appears, an F/F 404 is set. The F/F 404 has previously been reset by the VSYNC. After that, the F/F 404 is held in the set state until the next VSYNC is input. At the time point when the F/F 404 was set, the count value of the main scan counter 451 at that time is loaded into a latch F/F 405. This count value is used as an $X_1$ coordinate value. On the other hand, the count value of the subscan counter 452 at that time is loaded into a latch 406 and is used as a $Y_1$ coordinate value. Thus, the coordinates $P_1(X_1, Y_1)$ are obtained.

Each time the "1" signal is output to the signal line 403, the value from the main scan counter 451 is loaded into a latch 407. When the value from the main scan counter when the first 8-bit white appears is loaded into the latch 407, the magnitude of this count value is compared with the data in a latch 410 (this data has been set to the maximum value in the X direction at the time point of the VSYNC) by a comparator 409. If the data in the latch 407 is smaller, the data in the latch 407 is loaded into the latch 410. On the other hand, at this time, the value of the subscan counter 452 is loaded into a latch 411. The above operations are performed by the time when the next 8 bits are input to the shift register 401. As mentioned above, by executing the comparison of the data in the latches 407 and 410 with respect to the whole image area, the minimum value in the X direction of the original area remains in the latch 410 and the coordinate in the Y direction at this time remains in the latch 411. Since the main scan counter 451 is the down counter, the coordinate corresponding to the minimum value in the X direction indicated the coordinate which is farthest from SP in the main scan direction. Thus, the coordinates $P_3(X_3, Y_3)$ are obtained.

A F/F 412 is set at the time point when the 8-bit white first appears every main scan line. The FIF 412 is reset by the horizontal sync signal HSYNC and is set by the first 8-bit white. The F/F 412 is held in the set state until the next HSYNC is input. The value of the main scan counter corresponding to the position of the white signal which first appears in one line at the time point when the F/F 412 is set is into a latch 413. The magnitude of the value in the latch 413 is compared with the magnitude of data in a latch 415 by a comparator 416. At the time point of the generation of the VSYNC, the minimum value "0" in the X direction has been set in the latch 415.

If the data in the latch 415 is smaller than or equal to the data in the latch 413, a signal 417 is made active and the data in the latch 413 is loaded into the latch 415. The above operations are executed for the time interval between the HSYNC and the next HSYNC.

By executing the above comparing operation with respect to the whole image area, the maximum value in the X direction of the original coordinates, that is, the X coordinate of the white signal at a point which is nearest to the scan start time point in the main scan direction remains in the latch 415.

The above X coordinates is $X_2$. When the signal 417 is output, the value from the subscan counter is loaded into a latch 418 and is set as $Y_2$. Thus, the coordinates $P_2(X_2, Y_2)$ are obtained.

Each time the 8-bit white appears in the whole image area, the value of the main scan counter and the value of the subscan counter at that time are loaded into latches 419 and 420. Therefore, upon completion of the prescan of the original, the count values at the time point when the 8-bit white lastly appears remain in the counters.

The above count values correspond to the coordinates $P_4(X_4, Y_4)$.

The data lines of the above eight latches (406, 411, 420, 418, 405, 410, 415, and 419) are connected to a bus line of the CPU 113 in FIG. 5. The CPU 113 can read the data when the prescan is finished.

Figure 3A:
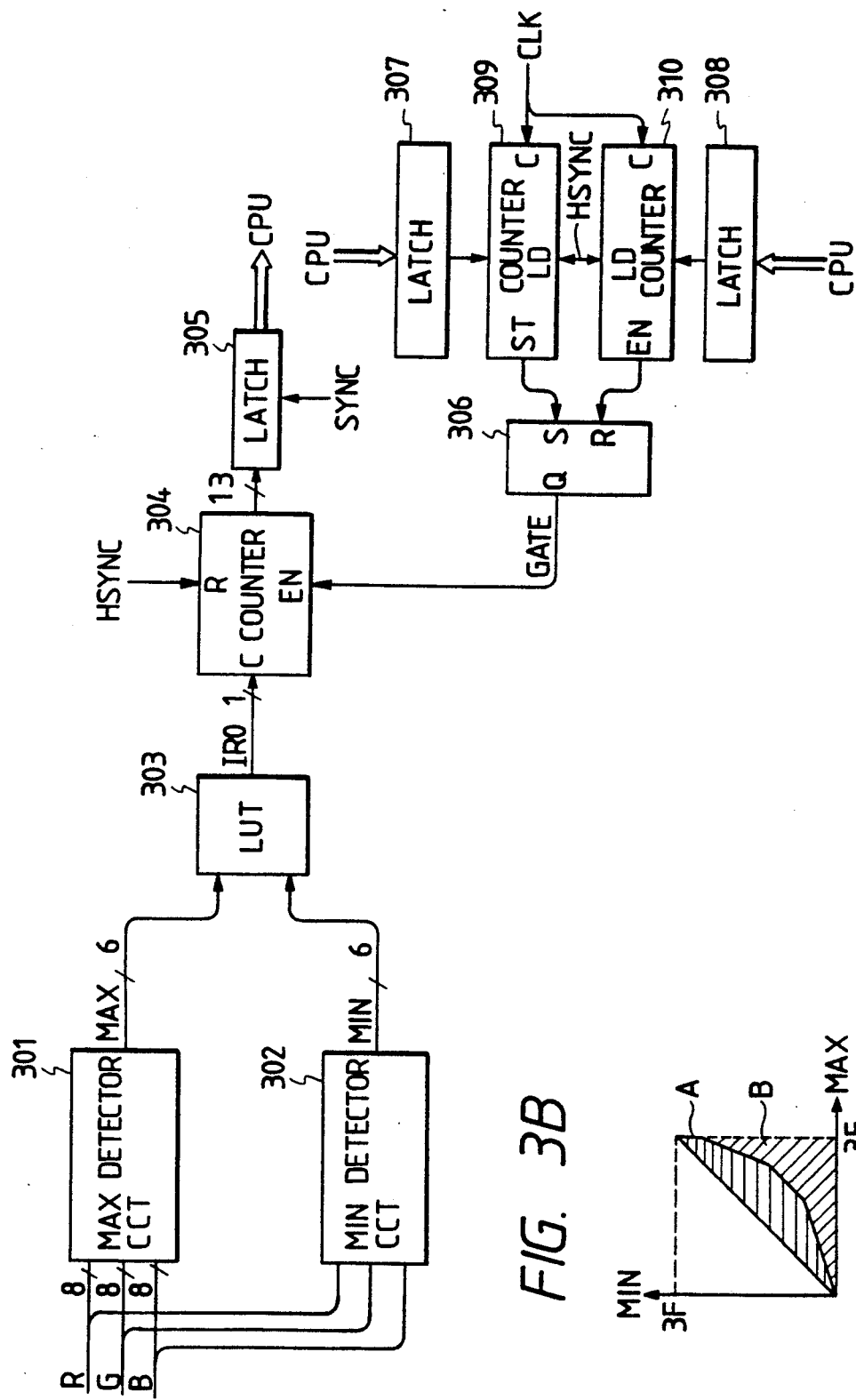
FIG. 3A is a block diagram of a color determination unit.

The content in the color determination unit (112 in FIG. 1) is shown in FIG. 3A and will be explained hereinbelow.

The R, G, and component signals for a certain pixel which were read out of the shift memory unit 103 are input to a max detector circuit 301 and a min detector circuit 302. A MAX signal=max (R, G, B) is output from the max detector circuit 301. A MIN signal=min (R, G, B) is output from the min detector circuit 302. In the embodiment, for the 8-bit input of each color of R, G, and B, the 6-bit output of each of the MAX and MIN is obtained.

Both of the MAX and MIN signals are input as addresses in a lookup table (LUT) 303, so that a color determination signal IRO of one bit is derived.

Figure 3B:
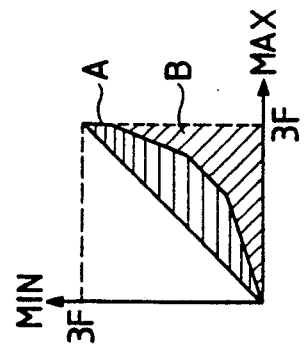
FIG. 3B is a diagram of a color determination table.

FIG. 3B shows the content of the LUT 303. In a two-dimensional flat plane which is constructed by the MAX and MIN input signals, an area A is determined to be an achromatic color and a "0" signal is output, while an area B is decided to be a chromatic color and a "1" signal is output. The determination signal IRO obtained as mentioned above is input as a clock of a counter 304.

The counter 304 is reset by the horizontal sync signal HSYNC and counts the number of pixels which were determined to be the chromatic color in the determination signal IRO in the section which is permitted by a GATE signal as an output of a flip-flop 306 in one main scan line. The count value is read out by the CPU 113 through a latch 305.

The flip-flop 306 is set by a count-up signal of an ST counter (start bit counter) 309 and is reset by a count-up signal of an EN counter (end bit counter) 310 and generates a count permission signal GATE of the counter 304. The ST counter 309 and the EN counter 310 count down the count values written in latches 307 and 308 by the CPU 113, respectively.

As mentioned above, the number of chromatic color determination pixels in an arbitrary section of each main scan line can be counted.

Figures 9, 9A:
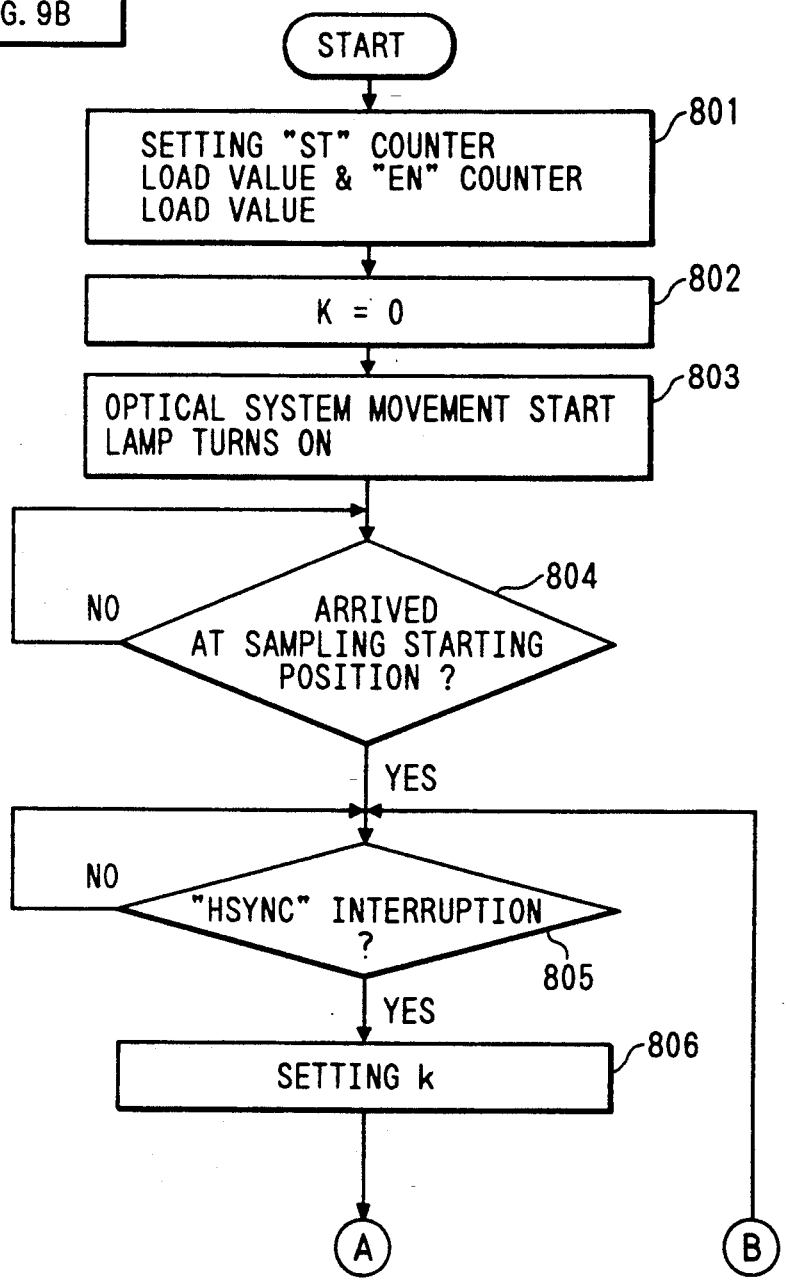
FIGS. 9A and 9B are control flowcharts for the color determination.
Figure 9B:
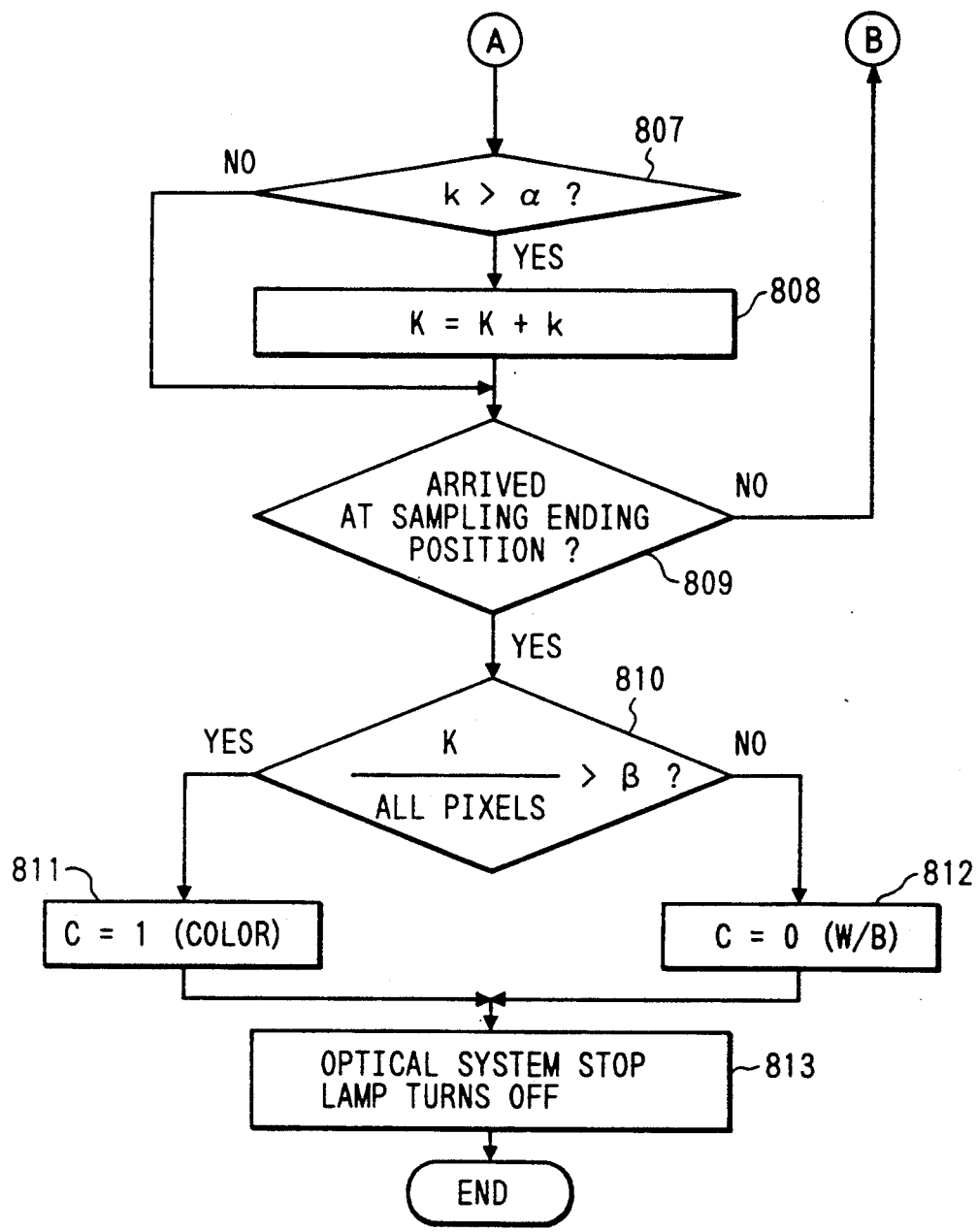

FIG. 9 shows a fundamental operation control procedure for the determination of the original color and the control procedure will now be described hereinbelow.

First, the load value of the ST counter 309 to control the determination section is set into the latch 307 and the load value of the EN counter 310 is set into the latch 308 (step 801). A counter K in the RAM to integrate the count value of the counter to count the number of chromatic pixels is initialized to "0" (802).

The movement of the optical system is started and the original illuminating lamp is lit on (803). When the optical system has reached a sampling starting position with respect to the subscan direction (804), the CPU 113 waits for the interruption by the horizontal sync signal HSYNC (805). If the interruption occurs, the CPU 113 reads out the result of the counting of the counter 304 from the latch 305 and sets into a buffer k in the RAM (806). If the value stored in the buffer k is larger than a predetermined number $\alpha$ of pixels (807), the value of k is added to the count value of the integrating counter K (808). $\alpha$ denotes one of the simplest means for eliminating the noises. The above adding operation is continued until the optical system arrives at a sampling ending position (809).

After completion of the sampling operation, the ratio between the addition result K and total number of pixels which were used for discrimination is obtained and compared with a predetermined value $\beta$ (810). When the ratio is larger than $\beta$, the original is determined to be a color original and, for instance, "1" is set into an area C in the RAM (811). On the contrary, when the ratio is smaller than or equal to $\beta$, the original is decided to be a black and white original and, for example, "0" is likewise set into the area C in the RAM (812).

After that, the optical system is stopped, the lamp is lit off, and the original color determining operation is finished.

A method in which the ratio between K and the total number of pixels is used as a discriminating condition is merely an example. It is also possible to use a method whereby K is simply compared with a predetermined value.

Figures 1, 7:
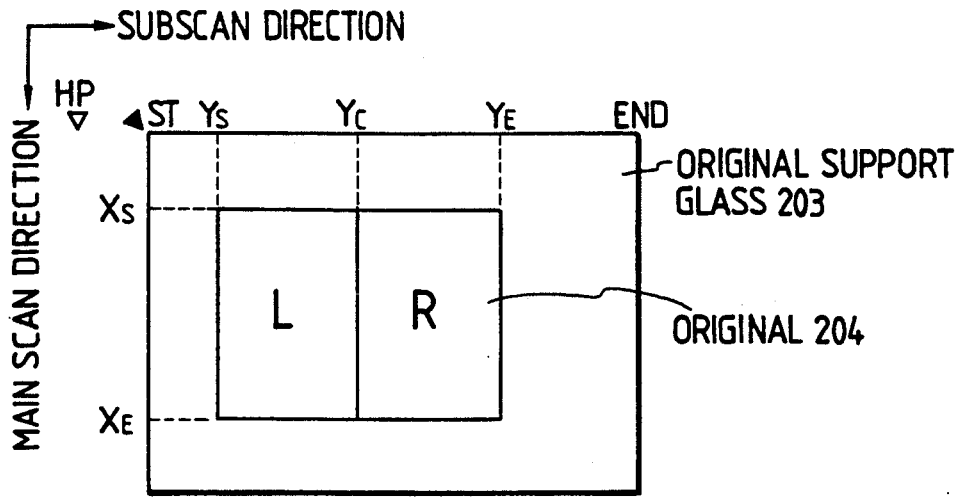
Figures 2, 7:
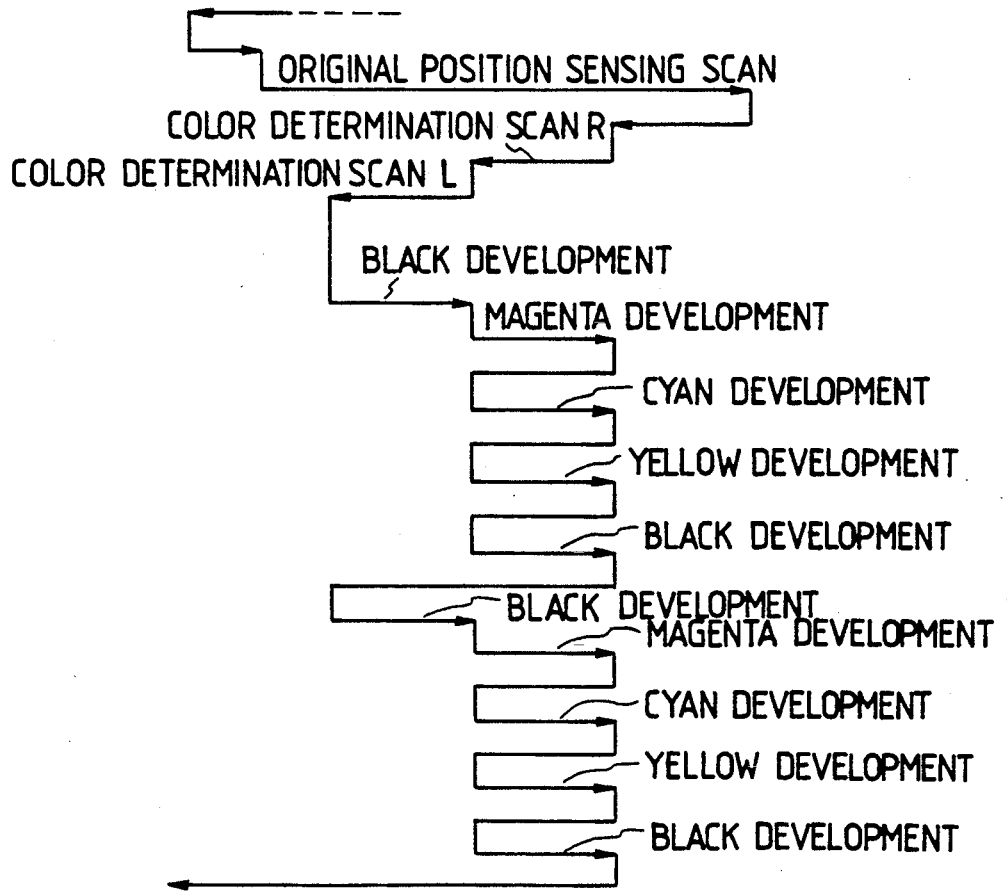

FIGS. 5-1 and 5-2 show the copying operation in the case of using the RDF 230 and explanation will now be made hereinbelow.

In the case where three sets of copy outputs which were collated as shown in FIG. 5-2 are obtained from originals of three pages put on the RDF 230 as shown in (A) in FIG. 5-1, the RDF 230 sequentially conveys the lowest one of a plurality of originals to the platen 203 one by one. That is, the states of the originals are shifted such as (A)→(B)→(C)→(D)→(B)→(C)→(D)→(B)→(C)→(D)-→(A). In the states of (B), (C), and (D), the copying operations of the third page, second page, and first page are executed.

In the embodiment, upon feeding of the original at the first circulation, a discrimination about the black and white original/color original is executed with respect to each original. The result of the discrimination is stored every original. With respect to the second and subsequent circulations, the copying operation for each original is controlled on the basis of the stored results of the discrimination at the first circulation.

Figure 6B:
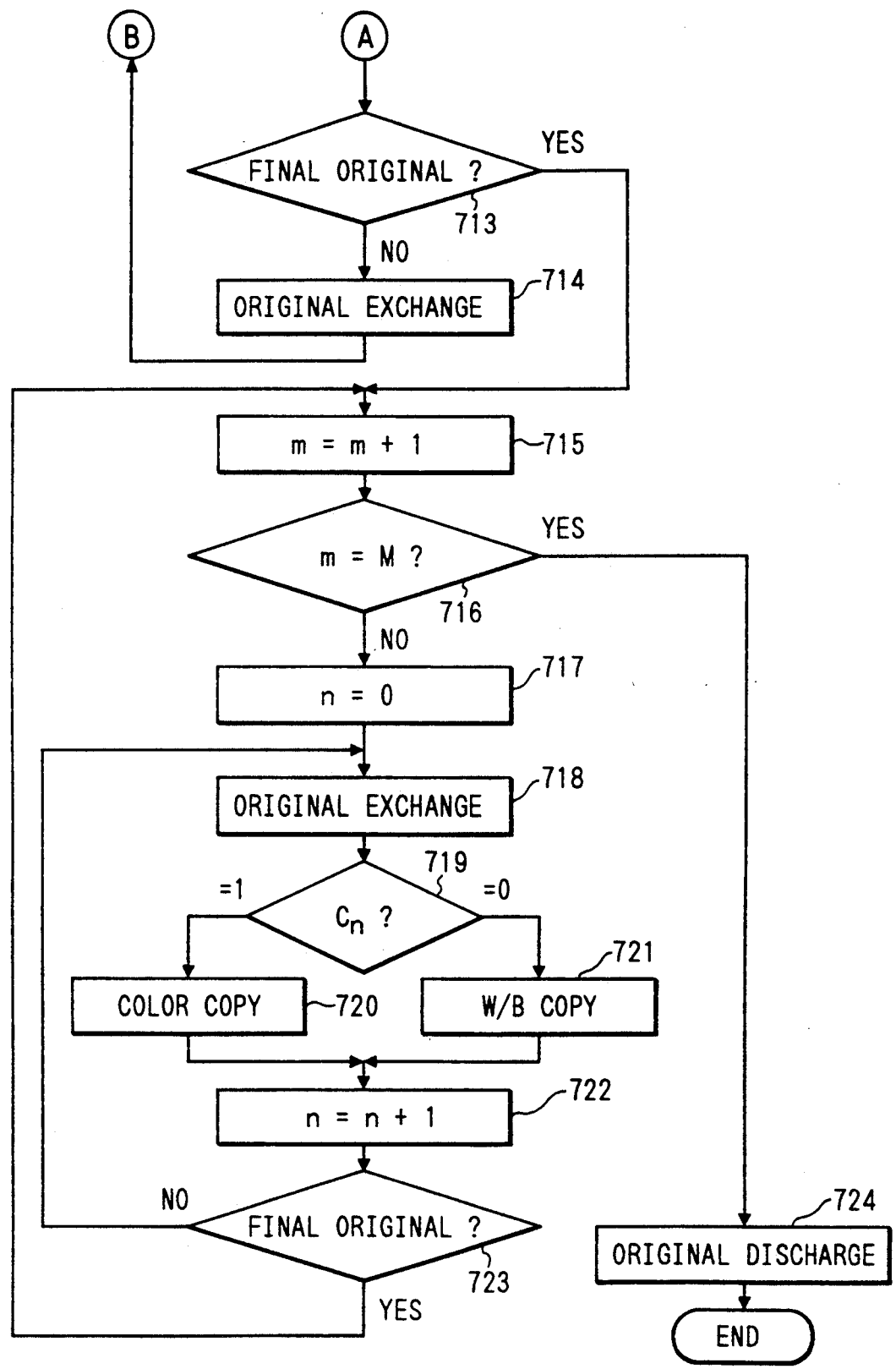

A control procedure for the page collating copy is shown in FIG. 6 and will be explained hereinbelow.

First, the number of setting copies is set into an area M in the RAM (701). The first original is fed by the RDF 203 (702). The original size is received from the RDF 230 through a serial communication and is set into areas DX and DY in the RAM (703).

Since the mounting reference points on the original support glass 203 of the original which was fed by the RDF 230 have previously been known, the coordinates of the main scan and subscan of the reference points are set into areas XS and YS in the RAM and, further, the rear edge coordinates in the main scan direction and subscan direction of the original position are set into areas XE and YE in the RAM as XE=XS+DX and YE=YS+DY (704). Then, a count n in the RAM to count the number of originals is initialized to "0" and a counter m in the RAM to count the number of copies completed is initialized to "0" (705).

As mentioned in FIG. 3, XS and XE is set as a main scan section for discrimination (706). The sampling operation which has already been described in the control flow in FIG. 9 is executed (707). The result of the discrimination about the black and white original/color original which was obtained on the basis of the sampled data is set into an area Cu in the RAM in a manner such that the black and white original is set to "0" and the color original is set to "1" (708). The results of the discrimination as many as the maximum number of originals which can be mounted in the RDF 230 are defined as an array of only a capacity which can be stored. The results of the discrimination are sequentially stored into the area Cu in accordance with the order of the originals which are fed by the RDF 230.

Then, on the basis of the content in the area Cu (namely, "1" or "0")(709), the color copy is executed (710) if Cu=1 and the black and white copy is performed (711) if Cu=0. The count value of the counter n to count the number of originals is increased by "1" (712).

If the original which was fed onto the glass 203 is not the final original (713), the original is exchanged (714) by actuating the RDF 230. The processes in steps (707) to (713) are repeated.

In the case of the final original (713), it is regarded that the processing routine has been circulated once for a group of originals and the count value of the counter m to count the number of copies is increased by "1" (715). A check is made to see if the updated count value of the counter m is equal to a preset number M or not (716).

If the copying operations as many as the set number are not completed yet, the counter n is reset to "0" (717) and the original is exchanged (718) by actuating the RDF 230. The discrimination result Cu which had been detected at the first circulating time and was stored in the area in the RAM in correspondence to each original is read out in accordance with the value of the counter n. On the basis of the result ("1" or "0") of the discrimination (719), the color copy is executed (720) or the black and white copy is performed (721). Until the final original (723), the counter n is increased one by one (722) and the copying operations at the second and subsequent circulation times are executed.

After the copying operations as many as the set number have been completed in step (716), the final original is discharged (724) by the RDF 230 and all of the operations are finished.

As mentioned above, in the case of repetitively copying a plurality of originals by using the recyclable document feeder (RDF 230), by storing the result of the discrimination regarding the black and white original/color original which was executed only once for each original, the copying time at the second and subsequent circulation times can be fairly reduced.

In the embodiment, the discrimination about the black and white original/color original of each original and the copying operation at the first circulation time have been executed in parallel. However, the invention is not limited to the above method but can also use the following construction. That is, the copying operation is not performed but a plurality of originals are sequentially conveyed to the original exposing position by the RDF 230 and the discrimination about the black and white original/color original is executed with respect to all of the originals and the results are stored. After that, for the original which is fed by the RDF 230, the copying operation is executed on the basis of the result of the discrimination regarding the black and white original/color original which has previously been stored.

FIG. 7 shows a conceptual diagram of the page collation upon copying operation in the two-page separation mode and explanation will now be made hereinbelow.

FIG. 7-1 shows a state in which the original 204 was put onto the original support glass 203. In the case where the original is divided into two right and left areas R and L and color copied onto different papers, hitherto, the L side is scanned four times and the developing processes are executed in four colors and, thereafter, the R side is scanned four times and the developing processes are performed in four colors. However, in the case of copying an original such as a book or the like, for instance, if the left page comprises only sentences which were printed in only black and the right page comprises a color photograph, the execution of the copying operation of the left page by color is uneconomical from viewpoints of time and costs.

Therefore, as shown in FIG. 7-2, in a state in which the original is covered by the mirror surface pressing plate 200, the whole area of the glass 203 is first scanned to detect the position of the original, the color is discriminated for the right half side (R side) of the original area, and the color is then discriminated for the left half side (L side). Thus, if it is determined that, for instance, the left half L side relates to a black and white original and the right half R side relates to a color original, the L side is copied in only black and the R side is copied in color. By repeating the above operations, the pages can be collated in the multi-page copying mode.

Figure 8B:
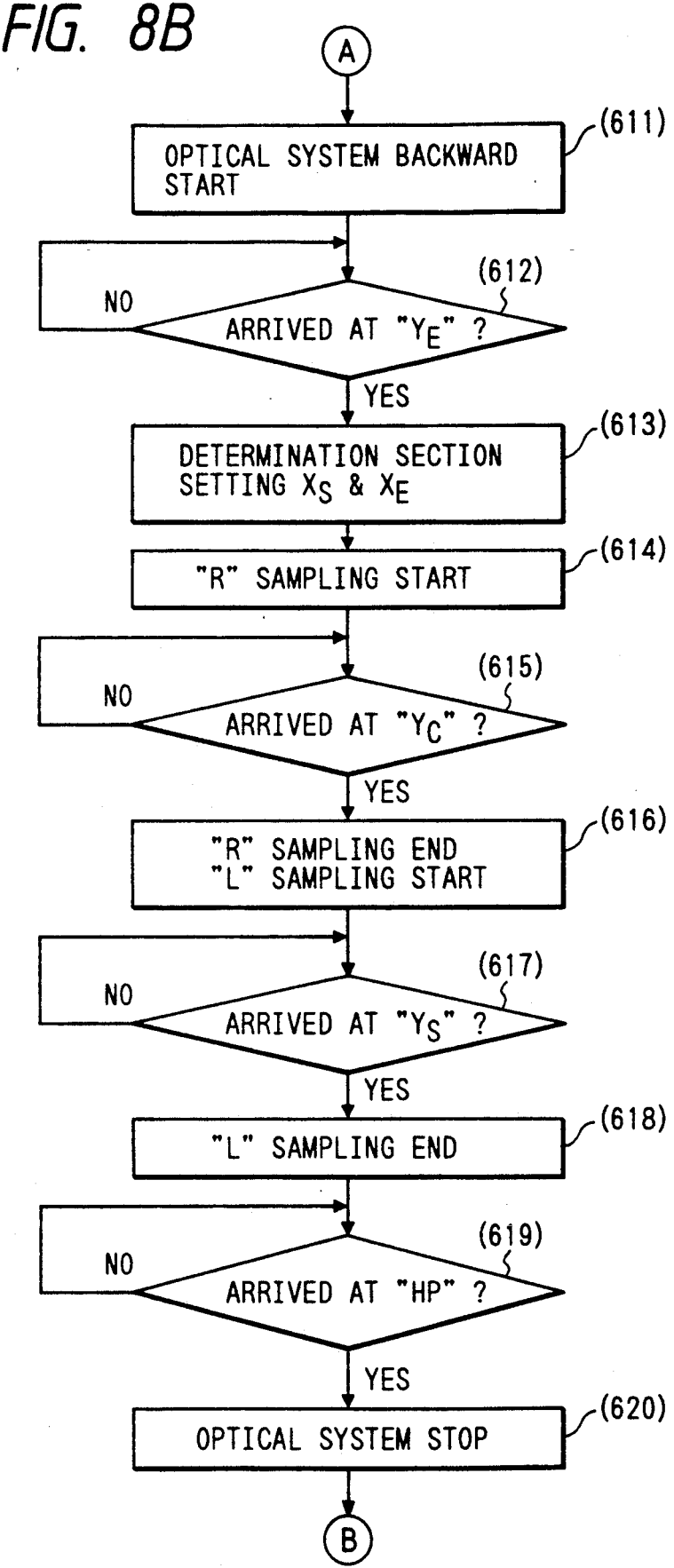
Figure 8C:
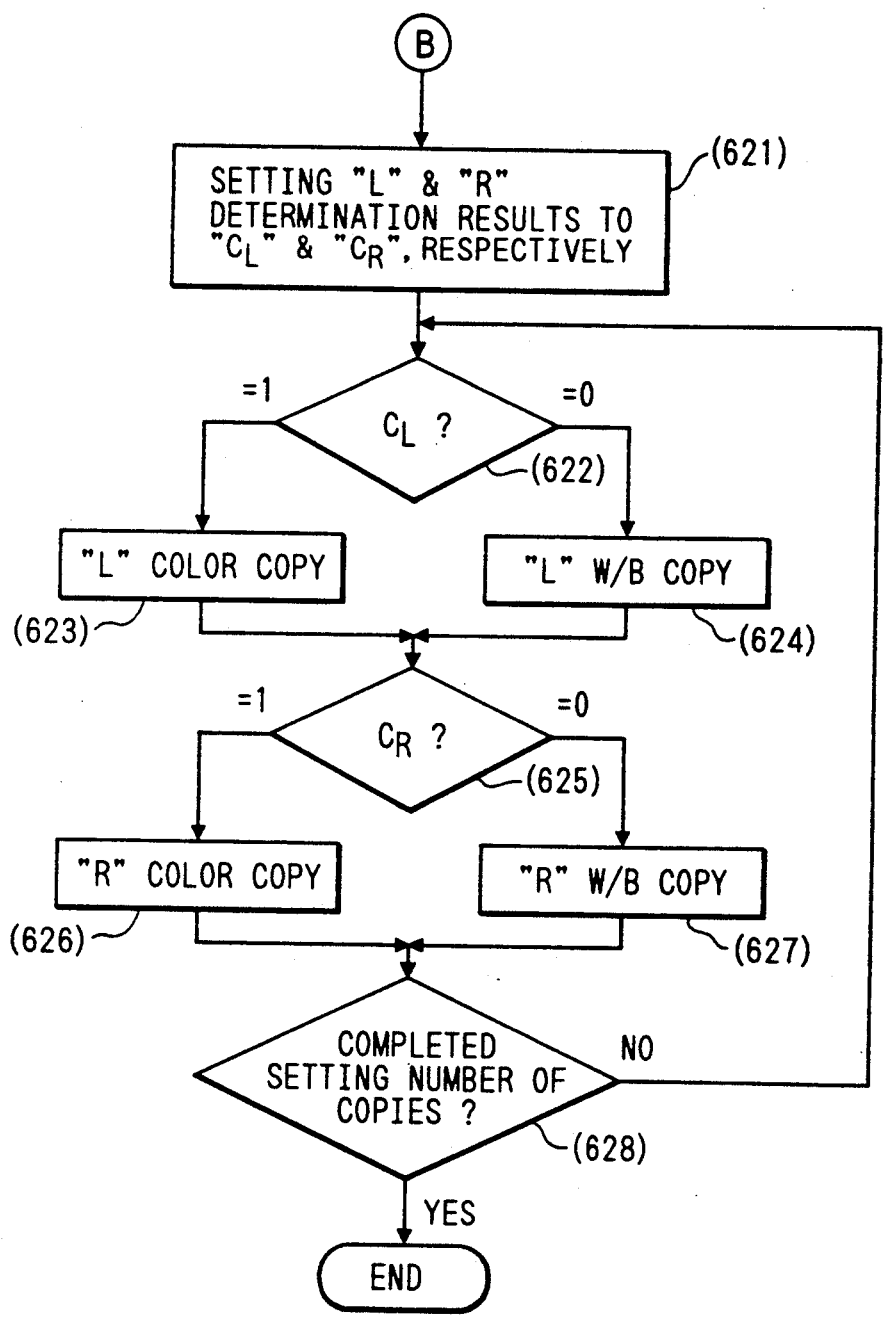

FIG. 8 shows a control flow and explanation will now be made hereinbelow.

First, the optical system is returned to a home position HP (FIG. 7-1) (601).

Then, the illuminating lamp is lit on (602) and the shading correction is executed (603). The forward movement of the optical system is started (604). When the optical system has reached a reference point ST of the original support glass (605), the detection of the original position is started (606). When the optical system has arrived at an end END of the original support glass (607), the optical system is stopped (608). The coordinates of the original position which were detected by the foregoing means are set into the areas XS, XE, YS, and YE in the RAM (609). The above four coordinates are shown in FIG. 4B.

Then, the coordinates to divide the original into two right and left sides are calculated by (YS+YE)/2 and set into an area YC in the RAM (610). The backward movement of the optical system is started (611). If the optical system has reached a position YE, the count values XS and XE to specify the main scan position of the original are set into the latches (307 and 308 in FIG. 3) for the color determination section counters mentioned above (613). The sampling process of the data to discriminate the color of the right half R side of the original is started (614).

When the optical system has arrived at the position YC (615), the sampling process of the R side is finished and the sampling process of the left half L side is started (616). If the optical system has reached the position YS (617), the sampling process of the L side is also finished (618). Further, if the optical system has reached the home position HP (619), the scan is stopped (620).

From the results of the sampling processes, a check is independently made to see if each of the image on each of the L and R sides is the black and white image or the color image and the results of the discrimination are stored into areas CL and CR in the RAM (621). In accordance with the results, the copying operation of the L side (622 to 624) and the copying operation of the R side (625 to 627) are repetitively executed until the completion of the set number of copies (628). The page collating process in the multi-page copying mode is finished.

In recent years, in the digital type copying apparatuses, there is provided the function such that an original is divided into a plurality of areas, the divided areas are enlargedly copied to different papers, and the copy outputs are finally joined, thereby realizing an ultra enlarged copy of a paper size or more. For instance, such a function is referred to as a multi-page enlargement.

In such a multi-page enlargement copy, as an enlargement ratio which can be executed increases, the number of divided areas of the original increases. In the case of outputting two or more copies in such a multi-page enlargement copying mode, the storage of the data indicative of the black and white image/color image every divided area is effective to reduce the copying time. The idea shown in FIG. 7 can be directly applied.

Although the above embodiments relate to the means for discriminating whether the area to be copied relates to the black and white image or the color image, the idea of the invention can be applied to the whole means for discriminating the attribute of an original.

As another embodiment, a density of an original can be mentioned as an example of the attribute.

Figure 10:
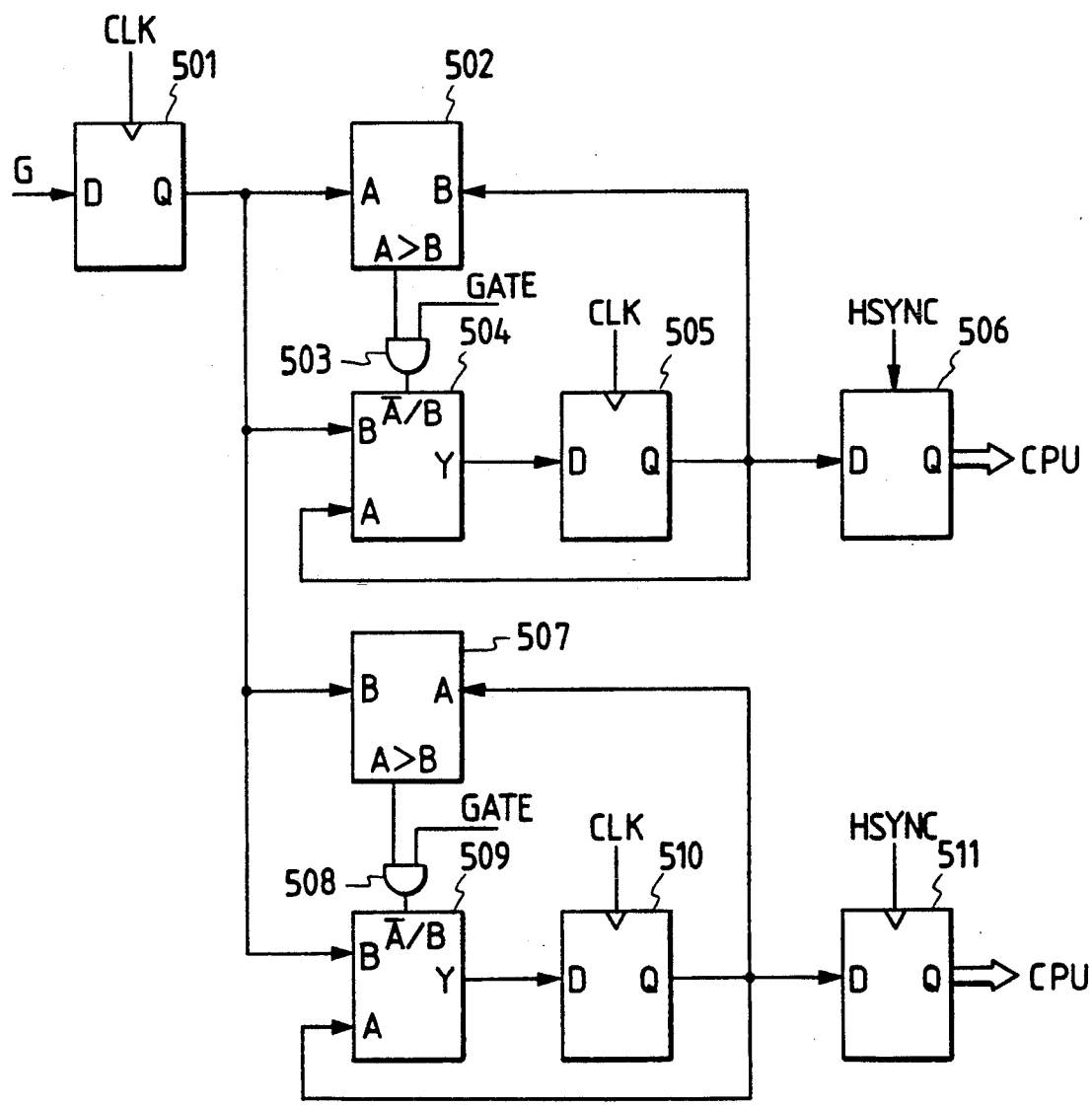
FIG. 10 is a block diagram of a density sensing unit of the third embodiment.

FIG. 10 shows a block diagram of an original density detection circuit and explanation will now be made hereinbelow.

For instance, the G (green) output of the shading correction unit (102 in FIG. 1) is input to a latch 501. An output of the latch 501 is sent to a comparator 502 and is compared with an output of a video signal latch 505 of one or more clocks before. When the output of the latch 501 is larger, a "1" output is sent to a gate 503. When both of the section signal GATE which has been described in FIG. 3 and an output of the comparator 502 are set to "1", the gate 503 allows the new output of the video signal latch 501 to be transmitted to the latch 505 through a selector 504.

By continuing the above operations for a period of time of one main scan line, the maximum density for such a period of time is latched into a latch 506 and can be read out by the CPU 113.

By a procedure similar to the above, a comparator 507, a gate 508, a selector 509, and a latch 510 can detect the minimum density for a period of time of one main scan line and the CPU 113 can read out the minimum density through a latch 511. As a result of that the above processes were executed for a predetermined subscan section, the CPU 113 can construct, for instance, a histogram of the maximum and minimum densities in a predetermined area. An optimum density transformation curve can be made from the histogram and can be applied to the density transformation unit (107 in FIG. 1).

By storing the optimum density transformation curve for each of a plurality of areas to be copied, it is possible to obtain an effect which is substantially equivalent to the storage of the information regarding the black and white original/color original in the first and second embodiments.

As described above, since the data regarding the black and white original/color original for each of a plurality of original areas is stored and the copying operation is executed on the basis of the contents stored, for example, the copying time in the page collation copying mode using the recyclable automatic document feeder or the like can be remarkably reduced.

The present invention is not limited to the foregoing embodiments but many modifications and variations are possible within the spirit and scope of the appended claims of the invention.

What is claimed is:

1. A color image processing apparatus for processing a plurality of originals, comprising:
   scanning means for scanning each one of the plurality of originals one by one when the originals are fed by a feeder a first time and fed by the feeder at least one subsequent time, each of the plurality of originals having an image thereon;
   discriminating means for discriminating attributes of each image of each one of the plurality of originals scanned by said scanning means when the plurality of originals are fed the first time;
   memory means for storing a plurality of attribute data representing the attributes of each image of the plurality of originals discriminated by said discriminating means;
   read out means for reading out from said memory means the attribute data associated with each one of the plurality of originals scanned by said scanning means when the plurality of originals are fed the subsequent time; and
   processing means for processing each image of the plurality of originals scanned by said scanning means in accordance with the attribute data read out from said memory means by said read out means when the plurality of originals are fed the subsequent time.

2. An apparatus according to claim 1, wherein said read out means reads corresponding attribute data from said memory means a plurality of times for a selected original, and wherein the corresponding image of the selected original is processed a plurality of times by the processing means in accordance with the corresponding attribute data.

3. An apparatus according to claim 1, wherein the discriminating means discriminates whether the image of each original is a color image or a black and white image.

4. An apparatus according to claim 1, further comprising feeding means for sequentially feeding the plurality of originals one by one to an image processing position by said processing means.

5. An apparatus according to claim 1, wherein the processing means records the images of the plurality of originals onto a recording medium.

6. An apparatus according to claim 1, wherein the processing means executes a color process or a black and white process to the image of the original in accordance with the attribute data.

7. An apparatus according to claim 1, wherein said scanning means photoelectrically reads the images of the plurality of originals, and wherein said discriminating means discriminates on the basis of an output of said scanning means.

8. An apparatus according to claim 1, further comprising a platen on which the plurality of originals are mounted, and wherein said scanning means scans the plurality of originals mounted on said platen.

9. A color image processing apparatus for processing a plurality of originals, comprising:
   feeding means for feeding the plurality of originals one by one to an original exposing position a first time and at least one subsequent time, each one of the plurality of originals having an image thereon;
   scanning means for scanning each one of the plurality of originals one by one when the originals are fed to the original exposing position by said feeding means the first time and the at least one subsequent time;
   discriminating means for discriminating attributes of each one of the images of the plurality of originals scanned by said scanning means when the plurality of originals are fed the first time;
   memory means for storing a plurality of attribute data representing the attributes of each one of the images of the plurality of originals discriminated by said discriminating means;
   read out means for reading out from said memory means the attribute data associated with each one of the plurality of originals when the plurality of originals are fed the subsequent time to the original exposing position by said feeding means; and
   processing means for processing each image of the plurality of originals scanned by said scanning means in accordance with the attribute data read out from said memory means by said read out means when the plurality of originals are fed the subsequent time.

10. An apparatus according to claim 9, wherein said read out means reads associated attribute data from said memory means a plurality of times for a selected original, and wherein the image of the selected original is processed a plurality of times by the processing means in accordance with the associated attribute data.

11. An apparatus according to claim 9, wherein said discriminating means discriminates whether the image of each original is a color image or a black and white image.

12. An apparatus according to claim 9, wherein said processing means records the images of the plurality of originals onto a recording medium.

13. An apparatus according to claim 9, wherein the processing means executes a color process or a black and white process to the images of the plurality of originals in accordance with the attribute data.

14. An apparatus according to claim 9, wherein said scanning means photoelectrically reads the images of the plurality of original and wherein said discriminating means discriminates on the basis of an output of said scanning means.

15. An apparatus according to claim 9, wherein said feeding means feeds a selected original to the original exposing position a plurality of times, and wherein said read out means reads corresponding attribute data from said memory means a plurality of times for the selected originals.

16. An image processing apparatus, comprising:
   feeding means for feeding a selected original to an original exposing position a first time and at least one subsequent time, the selected original having an image thereon;

scanning means for scanning the selected original fed to the original exposing position by said feeding means;

discriminating means for discriminating an attribute of the image of the selected original when the selected original is fed the first time to the original exposing position by said feeding means;

memory means for storing attribute data representing the attribute of the image of the selected original discriminated by said discriminating means when the selected original is fed the first time;

read out means for reading out corresponding attribute data from said memory means when the selected original is fed the subsequent time to the original exposing position; and processing means for processing the image of the selected original scanned by said scanning means in accordance with the corresponding attribute data read out from said memory means by said read out means when the selected original is fed the subsequent time.

17. An apparatus according to claim 16, wherein the discriminating means discriminates whether the image of the selected original is a color image or a black and white image.

18. An apparatus according to claim 16, wherein said feedings means sequentially feeds a plurality of originals one by one to an image processing position by said processing means.

19. An apparatus according to claim 16, wherein said processing means records the image of the selected original onto a recording medium.

20. An apparatus according to claim 16, wherein said processing means executes a color process or a black and white process to the image of the selected original in accordance with the corresponding attribute data.

21. An apparatus according to claim 16, wherein said scanning means photoelectrically reads the image of the selected original, and wherein said discriminating means discriminates on the basis of an output of said scanning means.

* * * * *

UNITED STATES PATENT AND TRADEMARK OFFICE
CERTIFICATE OF CORRECTION

PATENT NO. : 5,313,312
DATED : May 17, 1994
INVENTOR(S) : Masanori Yamada

It is certified that error appears in the above-identified patent and that said Letters Patent is hereby corrected as shown below:

IN THE DRAWINGS

Sheet 1, Figure 1, "TRIMING" should read --TRIMMING--.

COLUMN 1

Line 22, "discriminated a" should read --discriminated. A--; and
Line 30, "e" should read --the--.

COLUMN 5

Line 45, "FIF 412" should read --F/F 412--.

COLUMN 6

Line 20, "and component" should read --and B component--.

COLUMN 7

Line 67, "count n" should read --counter n--.

Signed and Sealed this

Twenty-fifth Day of October, 1994

Attest:

BRUCE LEHMAN

*Attesting Officer*  *Commissioner of Patents and Trademarks*